United States Patent [19]

VanDyke

[11] Patent Number: 4,948,022

[45] Date of Patent: Aug. 14, 1990

[54] CONTAINER FOR CD OR CASSETTE COVERS

[76] Inventor: Robert J. VanDyke, 290 S. 1300 E., Springville, Utah 84663

[21] Appl. No.: 390,388

[22] Filed: Aug. 7, 1989

[51] Int. Cl.$^5$ .................................................. B60R 7/06
[52] U.S. Cl. .................................. 224/42.42; 224/275; 224/901; 206/387
[58] Field of Search ................... 224/273-278, 224/42.42, 42.45 R, 42.46 R, 901, 904, 224, 226, 236, 239, 240; 206/387; D3/30.1, 35, 99; D14/120, 121; D6/407; D12/190, 192; 248/205.2; 296/37.8, 37.12, 37.13; 211/40.88

[56] References Cited

U.S. PATENT DOCUMENTS

| | | | |
|---|---|---|---|
| D. 220,317 | 3/1971 | Adell | D3/33 |
| D. 246,550 | 11/1977 | Herk | D3/35 |
| D. 247,135 | 1/1978 | Woodhall | D3/35 |
| D. 290,187 | 6/1987 | Sakai | D3/35 |
| 338,833 | 3/1886 | Fahey | 224/42.46 R |
| 3,051,130 | 8/1962 | Morris | 224/42.46 R |
| 3,717,188 | 2/1973 | Green | 224/42.46 R X |
| 4,119,249 | 10/1978 | Hanson | 224/901 |
| 4,231,625 | 11/1980 | Perez et al. | 224/42.45 R X |
| 4,350,194 | 9/1982 | Brown | 224/274 X |
| 4,834,238 | 5/1989 | Hehn et al. | 206/387 |
| 4,846,382 | 7/1989 | Foultner et al. | 224/42.42 |

FOREIGN PATENT DOCUMENTS 61-34287  10/1986  Japan ..................... 206/387

Primary Examiner—Henry J. Recla
Assistant Examiner—Casey Jacyna
Attorney, Agent, or Firm—Terry M. Gernstein

[57] ABSTRACT

A holder for CD and cassette covers is releasably mountable on the dashboard of a vehicle adjacent to a slot into which such elements are inserted to be played by the recording and playback equipment of the vehicle. An insert element permits the holder to snugly contain one or a plurality of covers.

1 Claim, 2 Drawing Sheets

CONTAINER FOR CD OR CASSETTE COVERS

TECHNICAL FIELD OF THE INVENTION

The present invention relates to the general art of containers, and to the particular field of special containers.

BACKGROUND OF THE INVENTION

More and more people have CD players and cassette tape players installed in their automobiles, trucks, vans or boats. These devices are generally conveniently located on the dashboard of the vehicle, and are operated by inserting a suitable CD or cassette recording element into a receiving slot located on that dashboard.

These devices are quite popular, but often create a problem, and a potential hazard, due to the cover for the recording element being free after the recording element has been inserted into the recording player. The vehicle operator often tries to place the cover in a convenient location, and sometimes this is done while the vehicle is in motion. The vehicle operator may be tempted to search for a storage spot, or try to recover a cover while simultaneously trying to operate the vehicle.

While the art has several examples of devices for storing cassettes or CDs, such storage devices have several drawbacks. First, devices, such as disclosed in U.S. Patents Des 246,550, Des 247,135 and Des 220,317 are of a single size and are not amenable to changing sizes to increase or decrease the tightness with which the stored cover fits in the container. This prohibits a single cover from being stored securely and subjects such cover to becoming lost should it fall out of the storage device. On the other hand, if a single cover is held tightly, a plurality of covers may not fit into the storage device in an easy manner. Thus, such devices tend to hold the covers in a loose manner.

Still further, the known devices are intended to be permanently mounted, and thus can be in the way when not in use.

Still further, the known devices do not display the stored elements in a manner that is both attractive and which can reveal what tape or CD is in the recording and playback equipment.

Therefore, there is a need for a container for storing CD or cassette recording element covers and which can be removably mounted in a convenient location and can store such covers in a manner such that a single cover can be as tightly stored as a plurality of covers.

OBJECTS OF THE INVENTION

It is a main object of the present invention to provide a container for storing CD or cassette recording element covers.

It is another object of the present invention to provide a container for storing CD or cassette recording element covers which can be removably mounted in a convenient location.

It is another object of the present invention to provide a container for storing CD or cassette recording element covers which can be removably mounted in a convenient location and can store such covers in a manner such that a single cover can be as tightly stored as a plurality of covers.

SUMMARY OF THE INVENTION

These, and other, objects are achieved by a holder that includes a unitary, single-piece body which has a flexible mounting hinge thereon, lip sections and an insert element. A hook and loop element fastening system is used to mount the holder in a convenient location and the insert element is removable to alter the internal size of the holder whereby single or multiple covers can be stored in a tight manner.

DETAILED DESCRIPTION OF THE PREFERRED EMBODIMENT OF THE INVENTION

Figure 1:
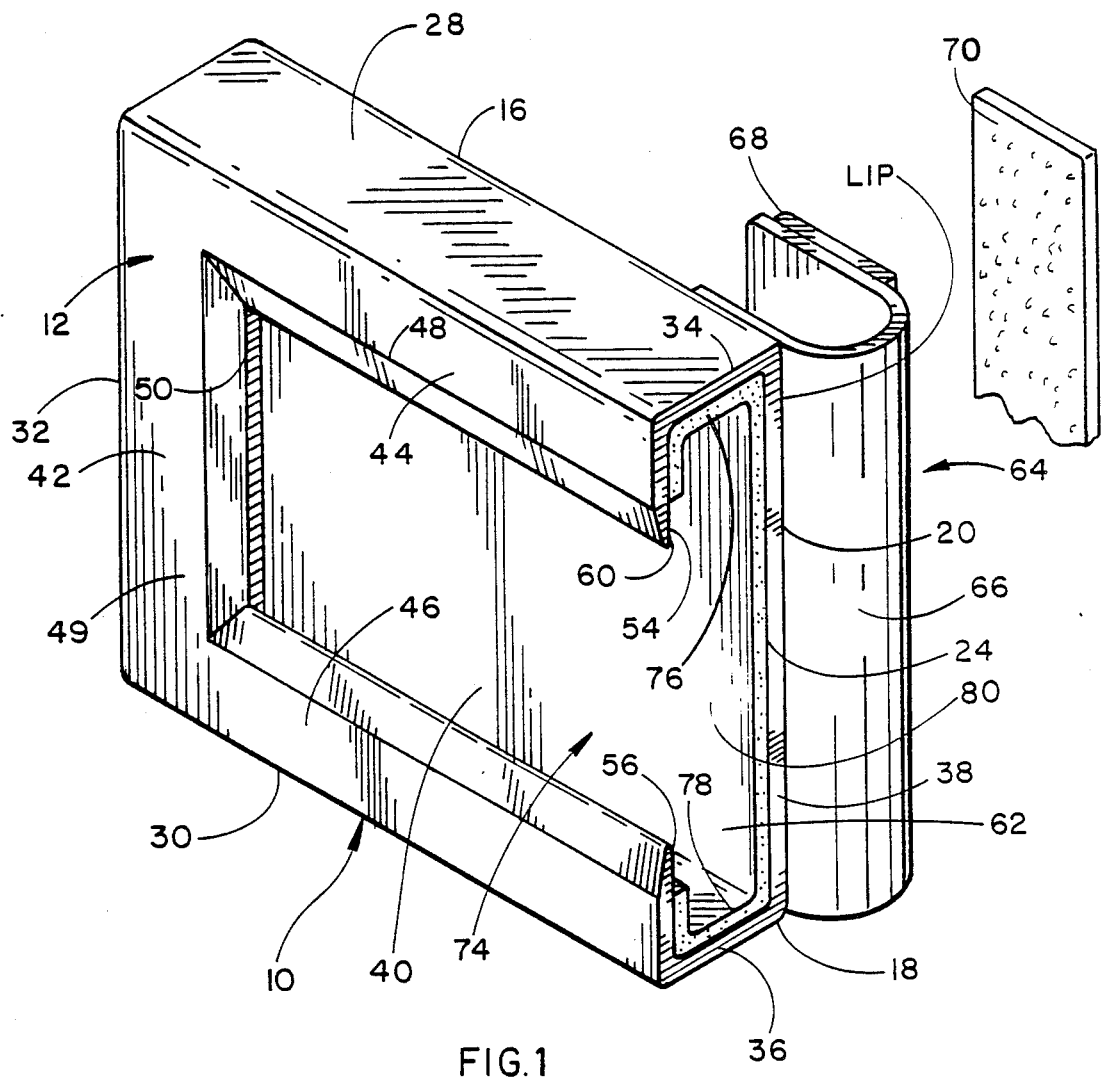
FIG. 1 is a perspective view of a CD and cassette cover holder embodying the present invention.
Figure 2:
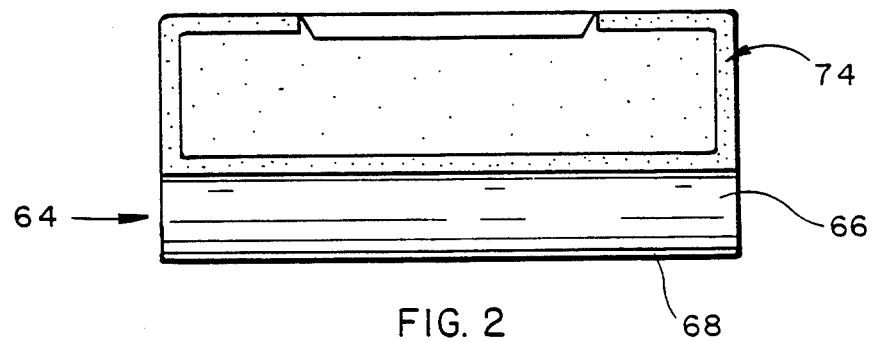
FIG. 2 is a top plan view of the holder.

Shown in the figures in a holder 10 that includes a unitary, one-piece body 12 that is made of plastic or other suitable material, and is adapted to be removably mounted on a vehicle dashboard subadjacent to a slot into which recording elements, such as CD, tape cassettes and the like are placed to be played.

The holder body 12 includes a rectangular back portion 14 having sides 16 and 18 and first and second ends 20 and 22. A first planar surface 24 serves as an inside surface of the holder, and a second planar surface 26 serves as the outer surface of the holder and will, in use, abut the dashboard of the vehicle.

Two rectangular side portions 28 and 30 are each connected to one of the back portion sides and extend forward of the plane containing the back portion to define the sides of the holder.

A rectangular bottom portion 32 is connected to the back portion bottom end 22 to extend forwardly of the back portion plane a distance equal to the extent of the side portions so that the side portions and the bottom portion terminate in a co-planar manner above the plane containing the back portion. As can be seen, the side portions have top edges 34 and 36, and the back portion has a top edge 38, all of which terminate in a common plane.

The holder also includes a lip section that defines a window 40 through which the stored cover is viewed. The lip section includes a bottom lip 42 attached to the top edge of the holder bottom 32 to extend in a plane that is parallel to the plane of the back, and two side lip sections 44 and 46 which are coplanar with the bottom lip section and which extend toward each other, and terminate in inner edges, such as edge 48 that are parallel to each other. The bottom lip section 42 terminates in an inner edge 50 that intersects the two side lip section inner edges. The lip sections intersect at miter-type edges, such as edge 49.

The window 40 is further defined by an apron section that includes an apron connected to each lip section inner edge. Each apron section is in the shape of a right triangle with a base connected to the lip section inner edge, the hypotenuse extending toward the back from the lip section inner edge and a side opposite to the hypotenuse that is in the plane of the inner surface of the lip section. The lip apron section terminates in ends 54 and 56 that are co-planar with the apron, side edges and back top edge as indicated in FIG. 1 by the reference number 60.

The apron is continuous about the window section 40 and the holder has an open top end 62 having a slot defined therein leading into the window.

A mounting assembly 64 is included and releasably attaches the holder to the dashboard of the vehicle adjacent to a slot S defined through a dashboard D of a vehicle, and through which the element moves to be played on and removed from the recording and playback equipment on the vehicle. The mounting assembly 64 includes a flexible hinge flap element 66 attached at one end thereof to the holder body and having a hook-and-loop attaching element 68 adjacent to the other end thereof. The hinge element is flexible, but is stiff enough to support the weight of a fully loaded holder when the attaching element 68 is engaged with a co-operating hook-and-loop attaching element 70 fixedly mounted on the dashboard of the vehicle. The holder body will engage the dashboard at the bottom end 22 to form a triangular support with the hook-and-loop fastening elements, and the hinge flap will form a living hinge so the holder can be moved into the most convenient orientation.

Figure 3:
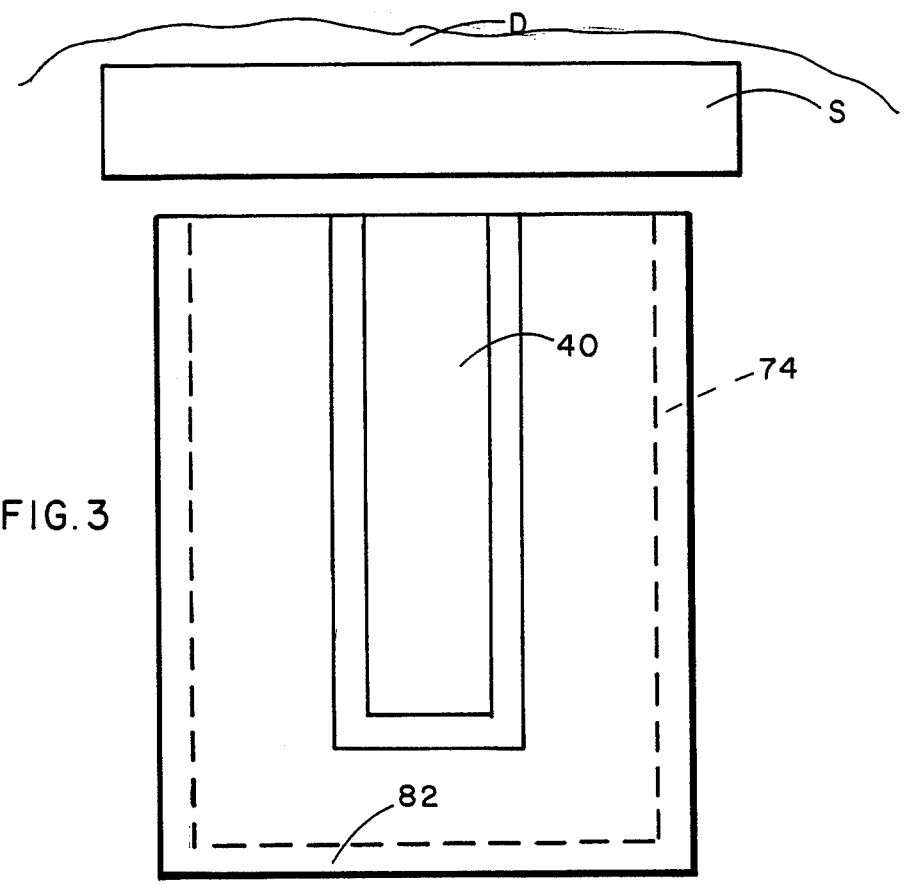
FIG. 3 is a front elevational view of the holder located subadjacent to a receiving slot.
Figure 4:
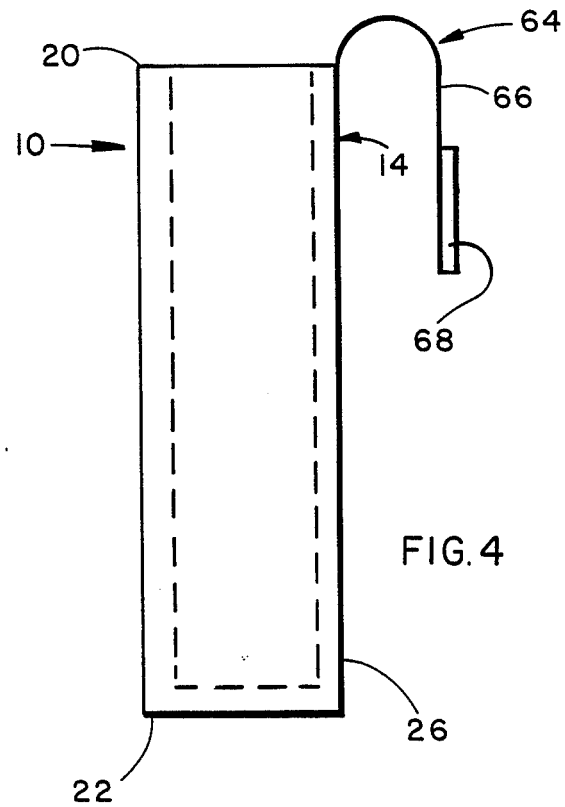
FIG. 4 is a side elevational view of the holder.

The interior volume of the holder is sized to contain a plurality of CD covers or cassette covers in a secure manner. The holder is mounted closely subadjacent to a slot, such as slot S shown in FIG. 3, so that as soon as a cassette or CD is inserted into the slot to be played on the recording equipment, the cover can be dropped into the holder and saved there.

To prevent a single cover from moving about, and perhaps even falling out, the holder includes an insert element 74. The insert element is formed of soft material, such as foam rubber, so that the insert element is flexed when the cover is inserted to grasp the cover and hold it tightly. Accordingly, the outer dimensions of the holder are slightly greater than the outer dimensions of the cover, while the inner dimensions of the insert element are slightly smaller than the outer dimensions of the cover. The insert element is removable so that the holder can be sized as desired.

The insert element 74 includes two side elements 76 and 78 that are located adjacent to the holder side sections and which extend for the entire length of the holder as measured from the top edge to the bottom edge thereof. A rear element 80 is located adjacent to the holder back portion and extends for the entire length of the holder and for the entire width thereof as measured between the sides of the back portion. A bottom element 82 lies on the bottom portion 32 and extends for the entire width of the holder and for the entire thickness thereof as measured between the front and rear portions thereof. Each of the sections of the insert portion is removable so the size of the holder can be customized as desired.

It is understood that while certain forms of the present invention have been illustrated and described herein, it is not to be limited to the specific forms or arrangements of parts described and shown.

I claim:

1. A holder comprising:
(A) a unitary, one-piece body which includes
   (1) a rectangular back portion having sides, first and second ends, a first planar surface and a rear planar surface, said rectangular back portion including
      (a) sides and ends,
      (b) a length dimension defined between said back portion ends,
      (c) a width dimension defined between said back portion sides, and
      (d) a thickness dimension defined between said first planar surface and said rear planar surface,
   (2) two rectangular side portions each connected to one of said back portion sides and extending forwardly of said back portion first surface, each rectangular side portion including
      (a) sides and ends,
      (b) a width dimension defined between said rectangular side portion sides, and
      (c) a length dimension defined between said rectangular side portion ends,
   (3) a rectangular bottom portion connected to said first back portion end and extending forwardly of said front planar surface, said body bottom portion including
      (a) sides and ends,
      (b) a width dimension defined between said bottom portion sides, and
      (c) a length dimension defined between said bottom portion ends,
   (4) a bottom lip section connected to said bottom portion and extending in a lip plane parallel to said back portion first surface and being spaced therefrom,
   (5) a lip side section connected to each side portion and extending in said lip plane to be co-planar with said bottom lip section, each lip side section having
      (a) a first side connected to one side of one of said rectangular side portions,
      (b) a second side located remotely from said first side, and
      (c) a width measured between said first and second sides,
   (6) an apron connected to each lip section, each apron including a sloping surface which slopes toward the back portion front surface from said lip plane, the aprons connected to said lip side sections sloping toward each other and being spaced apart and intersecting the apron connecting to said bottom lip section to form a continuous apron about said side and bottom lip portions,
   (7) said side portions, said back portion second end, said lip side sections and the aprons connected to each lip side section all including a top edge with all of said top edges lying in a common plane and forming a body open end,
   (8) a flexible hinge flap connected at one end thereof to said second back portion end and including a first surface located adjacent to said back portion rear planar surface and a second surface;
(B) a mounting assembly which includes
   (1) a first hook-and-loop fastener element mounted on said hinge flap second surface, and
   (2) a second hook-and-loop fastener element adapted to be mounted on a dashboard of a vehicle subadjacent to a slot for receiving CD or cassette recording elements, and
   (3) said first and second hook-and-loop fastening elements co-operating to mount said body adjacent to said slot with said body open end in position subadjacent to said slot; and
(C) an insert means for adjusting the size of said body to accommodate CD or cassette recording elements of various sizes, said insert means including (1) a rear section which includes
  (a) sides and ends,
  (b) a width dimension measured between said insert means rear section sides and which is approximately equal to but slightly less than the width dimension of said rectangular back portion,
  (c) a length dimension measured between said insert means rear section ends and which is approximately equal to but slightly less than the length dimension of said rectangular back portion, and
  (d) said insert means rear section being in removable abutting contact with said rectangular back portion,
(2) two side sections, each insert means side section including
  (a) sides and ends,
  (b) a width dimension measured between said insert means side section sides, and which is less than the width dimension of said body side portions,
  (c) a length dimension measured between said insert means side section ends, and which is less than the length dimension of said body side portions and is equal to the length dimension of said insert means rear section, and
  (d) said insert means side sections being in removable abutting contact with said body side portions,
(3) two front sections, each insert means front section including
  (a) sides and ends,
  (b) a width dimension defined between said insert means front section sides which is less than the width dimension of said body lip sections,
  (c) a length dimension defined between said insert means front section ends and which is equal to the length of said insert means rear section, and
  (d) said insert means front sections being in removable abutting contact with said body lip sections, and
(4) a bottom section which includes
  (a) sides and ends,
  (b) a width dimension defined between said insert means bottom section sides and which is less than the width of said body bottom portion width,
  (c) a length dimension defined between said insert means bottom section ends and which is less than said body bottom portion length, and
  (d) said insert means bottom section being in removable abutting contact with said body bottom portion,
(5) said insert means rear section, said insert means side sections and said insert means front sections all having one of the ends thereof co-planar with said body portion top edges, and each of said insert means sections being removable from said body independently of other insert means sections, and
(6) said insert means rear section, said insert means side sections and said insert means front sections all having thickness dimensions which are essentially equal to the thickness dimension of said body rear portion.

* * * * *